US009417089B2

(12) United States Patent
Kim (10) Patent No.: US 9,417,089 B2
(45) Date of Patent: *Aug. 16, 2016

(54) METHOD FOR MANAGING SCHEDULE USING USER'S LOCATION INFORMATION AND SYSTEM THEREOF

(71) Applicant: THINKWARE SYSTEMS CORPORATION, Seoul (KR)

(72) Inventor: Bo Young Kim, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,044

(22) Filed: Nov. 6, 2013

(65) Prior Publication Data

US 2014/0058665 A1    Feb. 27, 2014

Related U.S. Application Data

(63) Continuation of application No. 12/530,255, filed as application No. PCT/KR2007/006398 on Dec. 10, 2007, now Pat. No. 8,600,670.

(30) Foreign Application Priority Data

Mar. 7, 2007   (KR) .................. 10-2007-0022571

(51) Int. Cl.
*G06Q 10/10* (2012.01)
*G01C 21/36* (2006.01)

(52) U.S. Cl.
CPC .......... *G01C 21/3691* (2013.01); *G06Q 10/109* (2013.01)

(58) Field of Classification Search
None
See application file for complete search history.

(56) References Cited

U.S. PATENT DOCUMENTS 6,678,613 B2   1/2004   Andrews et al.
6,732,080 B1   5/2004   Blants
(Continued)

FOREIGN PATENT DOCUMENTS

KR   10-2005-0076224   7/2005
KR   10-2006-0007280   1/2006
(Continued)

OTHER PUBLICATIONS

International Search Report for PCT/KR2007/006398 mailed, Mar. 24, 2008.
(Continued)

*Primary Examiner* — Tuan C. To
*Assistant Examiner* — Genna Mott (57) ABSTRACT

A method for managing a schedule based on a user's location information by a system for managing a schedule. The method comprises receiving a schedule including at least one of an appointment location, appointment contents an appointment time, and appointment target person's phone number from the user; registering the schedule which includes the user's location information by a schedule registration unit of the system; detecting the user's location by a location detection unit of the system; and sending a message related to the schedule or the user's location by a sending unit of the system. The sending of the message related to the schedule or the user's location by the sending unit of the system sends information of a changed appointment time and place to the appointment target person when the user changes the appointment schedule.

8 Claims, 12 Drawing Sheets

(56) References Cited

U.S. PATENT DOCUMENTS

| | | |
|---|---|---|
| 6,898,569 B1 | 5/2005 | Bansal et al. |
| 7,139,722 B2 | 11/2006 | Perrella et al. |
| 7,499,715 B2 | 3/2009 | Carro et al. |
| 7,743,056 B2 | 6/2010 | Meisels et al. |
| 7,813,950 B2 | 10/2010 | Perrella et al. |
| 7,869,941 B2 | 1/2011 | Coughlin et al. |
| 2002/0019835 A1 | 2/2002 | Baur et al. |
| 2002/0059178 A1 | 5/2002 | Hirabayashi et al. |
| 2002/0068583 A1 | 6/2002 | Murray |
| 2002/0128850 A1* | 9/2002 | Chen et al. .......... 705/1 |
| 2002/0164995 A1 | 11/2002 | Brown et al. |
| 2003/0004776 A1* | 1/2003 | Perrella .......... G06Q 10/063116 705/7.19 |
| 2003/0014297 A1 | 1/2003 | Kaufman et al. |
| 2003/0046304 A1 | 3/2003 | Peskin et al. |
| 2003/0060979 A1* | 3/2003 | Andrews .......... G01C 21/20 701/408 |
| 2004/0207522 A1 | 10/2004 | McGee et al. |
| 2004/0263385 A1 | 12/2004 | Adamczyk et al. |
| 2005/0119927 A1 | 6/2005 | Patel |
| 2005/0184875 A1* | 8/2005 | Schmandt et al. ......... 340/573.1 |
| 2006/0041374 A1 | 2/2006 | Inoue |
| 2006/0041663 A1* | 2/2006 | Brown et al. .......... 709/226 |
| 2006/0143064 A1 | 6/2006 | Mock et al. |
| 2006/0189325 A1 | 8/2006 | Kim et al. |
| 2006/0218029 A1 | 9/2006 | Chin |
| 2007/0055561 A1 | 3/2007 | Perrella et al. |
| 2007/0118415 A1 | 5/2007 | Chen et al. |
| 2007/0226034 A1 | 9/2007 | Khan |
| 2007/0282661 A1 | 12/2007 | Franco |
| 2008/0167937 A1 | 7/2008 | Coughlin et al. |
| 2008/0177611 A1 | 7/2008 | Sommers et al. |
| 2008/0195312 A1* | 8/2008 | Aaron .......... G06Q 10/109 455/418 |
| 2009/0319172 A1 | 12/2009 | Almeida et al. |
| 2010/0118025 A1 | 5/2010 | Smith et al. |
| 2011/0010220 A1 | 1/2011 | Burnham et al. |

FOREIGN PATENT DOCUMENTS

| | | |
|---|---|---|
| KR | 10-2006-0093286 | 8/2006 |
| KR | 10-0650908 | 11/2006 |

OTHER PUBLICATIONS

Written Opinion of the International Searching Authority for PCT/KR2007/006398 mailed, Mar. 24, 2008.

* cited by examiner

METHOD FOR MANAGING SCHEDULE USING USER'S LOCATION INFORMATION AND SYSTEM THEREOF

This application is a Continuation of application Ser. No. 12/530,255, filed Sep. 8, 2009, which is a U.S. national phase of International Application No. PCT/KR2007/006398, filed Dec. 10, 2007, which designated the U.S. and claims priority to Korean Application No. 10-2007-0022571, filed Mar. 7, 2007, the entire contents of each of which are hereby incorporated by reference.

TECHNICAL FIELD

The present invention relates to a method and system for managing a schedule based on a user's location information, and more particularly to a method and system for managing a schedule by registering a schedule which includes a user's location information, detecting the user's location, and sending a message related to the schedule or the user's location to the user or a pre-registered person.

BACKGROUND ART

Generally, in a method for managing a schedule using a personal portable terminal, a user's schedule is reported at a scheduled time through a notice once a user registers the user's own schedule in advance.

As an example, when a registered schedule is a occasion of making an appointment with other person, a user needs information about an appointment time and also an appointment location, however, in a conventional method for managing a schedule, only an appointment time according to a schedule registered by the user is reported to the user, therefore the conventional method for managing the schedule has a problem that it is impossible to perfectly manage the schedule.

Therefore, a method of managing a schedule which can manage an appointment time and also user's location information is earnestly required.

In a conventional mobile terminal, while a user is provided a service of detecting the user's own location, the service mainly provides others with the user's location information, and thus the service may have a problem of an aversion of use due to privacy violation issues.

Therefore, a service using user's location information that can be actively used by a user without an aversion is required.

DISCLOSURE OF INVENTION

Technical Goals

The present invention provides a method and system for managing a schedule using a user's location information which registers a schedule including the user's location information, detects user's location, and provides information about the user's location or schedule.

The present invention also provides a method and system for managing a schedule using a user's location information which reports the user's location information in advance to the user or a pre-registered person when another user is close to a location pre-registered by the user.

The present invention also provides a method and system for managing a schedule using a user's location information which provides a user with optimal route information so that the user may arrive at an appointment location within a registered appointment time in the schedule.

The present invention also provides a method and system for managing a schedule using a user's location information which sends a pre-registered self management message to the user when the user is close to a pre-registered location in the schedule.

The present invention also provides a method and system for managing a schedule using a user's location information which sends the user's location information of moving to appointment information such as an appointment location registered in the schedule.

The present invention also provides a method and system for managing a schedule using a user's location information which assists the user to more methodically keep the user's schedule by increasing and/or decreasing the user's character index depending on whether the user arrives at an appointment location in time registered in the schedule by detecting a user's location.

Technical Solutions

To achieve the aforementioned purposes and solve the problems of the conventional art, according to the present invention, there is provided a method for managing a schedule using a user's location information including: registering a schedule which includes the user's location information; detecting the user's location; and sending a message related to the schedule or the user's location.

BEST MODE FOR CARRYING OUT THE INVENTION

A system for managing a schedule using user's location information according to another embodiment of the present invention includes: a schedule registration unit registering a schedule which includes a user's location information; a location detection unit detecting the user's location; and a sending unit sending a message related to the schedule or the user's location.

Figure 1:
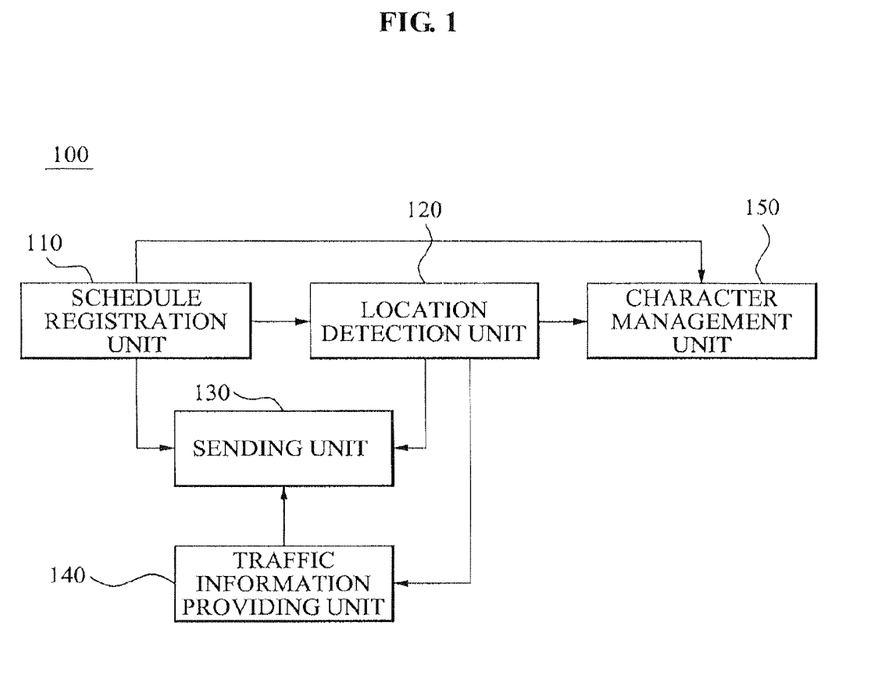
FIG. 1 is a diagram illustrating a configuration of a system for managing a schedule according to an embodiment of the present invention.

FIG. 1 is a diagram illustrating a configuration of a system 100 for managing a schedule according to an embodiment of the present invention.

Referring to FIG. 1, the system 100 for managing the schedule includes a schedule registration unit 110, a location detection unit 120, a sending unit 130, a traffic information providing unit 140, and a character management unit 150.

The schedule registration unit 110 is registered a schedule which includes user's location information. That is, the schedule registration unit 110 may be registered the schedule which includes location information corresponding to a location where a user is required to go or is not required to go from the user.

Figure 2:
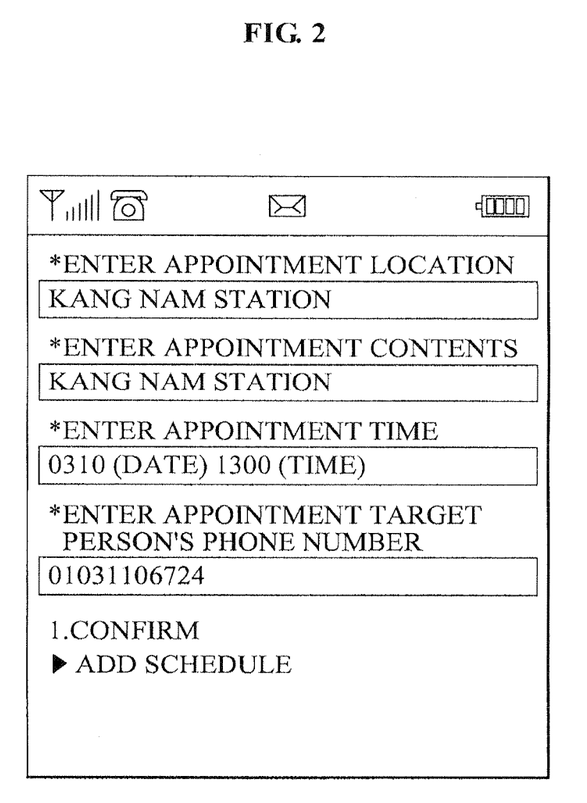
FIG. 2 is a diagram illustrating an example of registering an appointment schedule.

FIG. 2 is a diagram illustrating an example of registering an appointment schedule.

Referring to FIG. 2, the schedule registration unit 110 receives an appointment location, appointment contents, an appointment time and an appointment target person's telephone number from a user, and registers the received appointment location, appointment contents, appointment time and appointment target person's telephone number as an appointment schedule.

Figure 3:
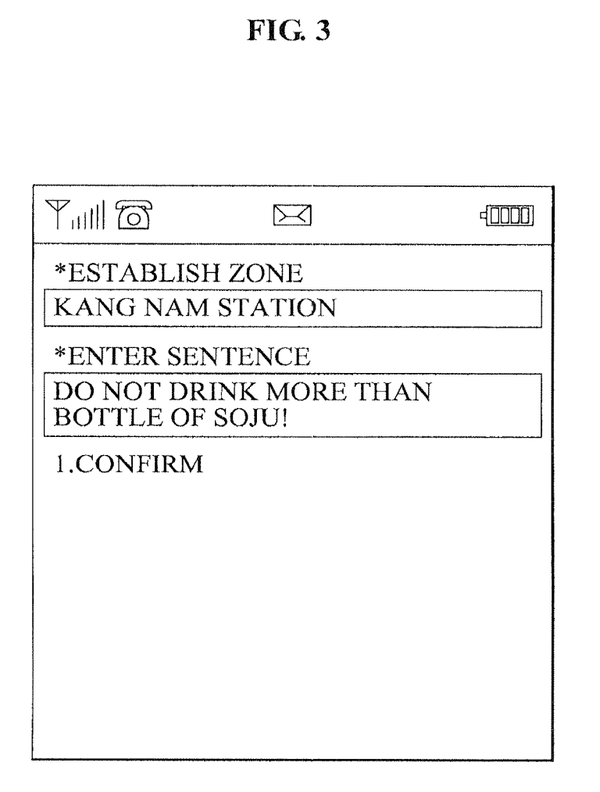
FIG. 3 is a diagram illustrating an example of establishing a zone and of registering a self-management message.

FIG. 3 is a diagram illustrating an example of establishing a zone and of registering a self-management message.

Referring to FIG. 3, the schedule registration unit 110 receives a user's location where to send a self-management message from the user to establish the received user's location as zone information or a specific Point of Interest (POI), and receives a phrase that the user is required to send as a self-management message to register the received phrase. As an example, when a user usually goes to drink around Kang Nam Station, the schedule registration unit 110 receives 'Kang Nam Station' from the user to register the received zone information as zone information, and receives a warning message such as 'Do not drink more than a bottle of Soju!' to register the received warning message as a self-management message.

As described above, unlike a conventional method of managing a schedule which mainly considers time information, the present invention may provide various types of messages and even traffic information, which are related to user's location information, based on the registered schedule by additionally registering the user's location information in the schedule.

The location detection unit 120 detects the user's location information. Specifically, when the user uses a mobile communication terminal, the location detection unit 120 may detect the user's location information by detecting a location of the mobile communication terminal via a base station.

The sending unit 130 sends the schedule or a message related to the user's location to the user or to the target person.

Figure 4:
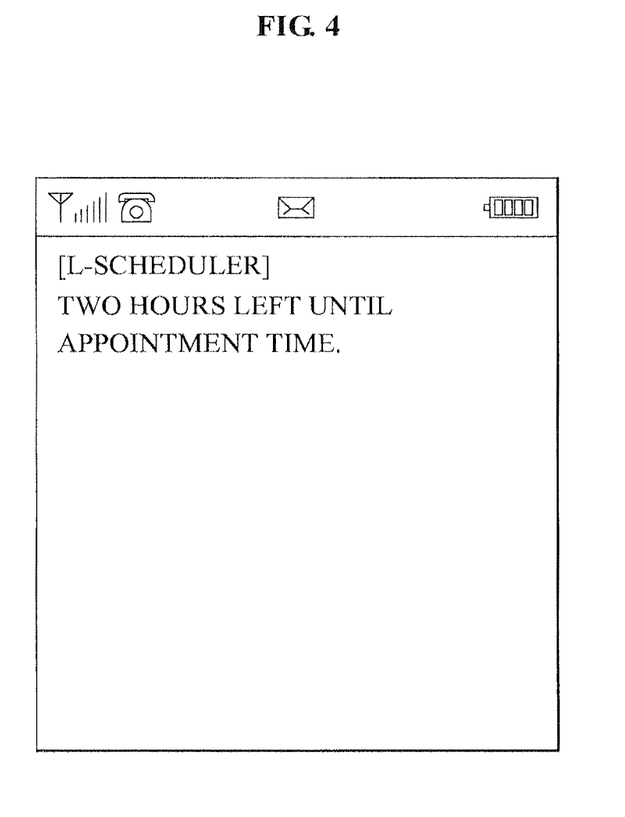
FIG. 4 is a diagram illustrating an example of a message that reports an appointment schedule.

FIG. 4 is a diagram illustrating an example of reporting the appointment schedule.

Referring to FIG. 4, the sending unit 130 of FIG. 1 provides a user with an appointment reporting message which includes appointment time information and appointment location information to report the appointment time in advance being registered in the schedule. Also, the sending unit 130 sends the appointment notice message to the user and also to the appointment target person registered in the schedule.

As described above, the present invention, according to the appointment schedule, reports both the appointment time and appointment location to the user or the appointment target person in advance, and therefore the user or the appointment target person may confirm the appointment time and the appointment location correctly.

The traffic information providing unit 140 provides traffic information from the user's location to the appointment location based on the user's location information. The traffic information may include the information about a short-cut to the appointment location when the user uses a vehicle and information about line numbers of a bus or a subway and a required time to get to the appointment location when the user uses public transportation.

Figure 5:
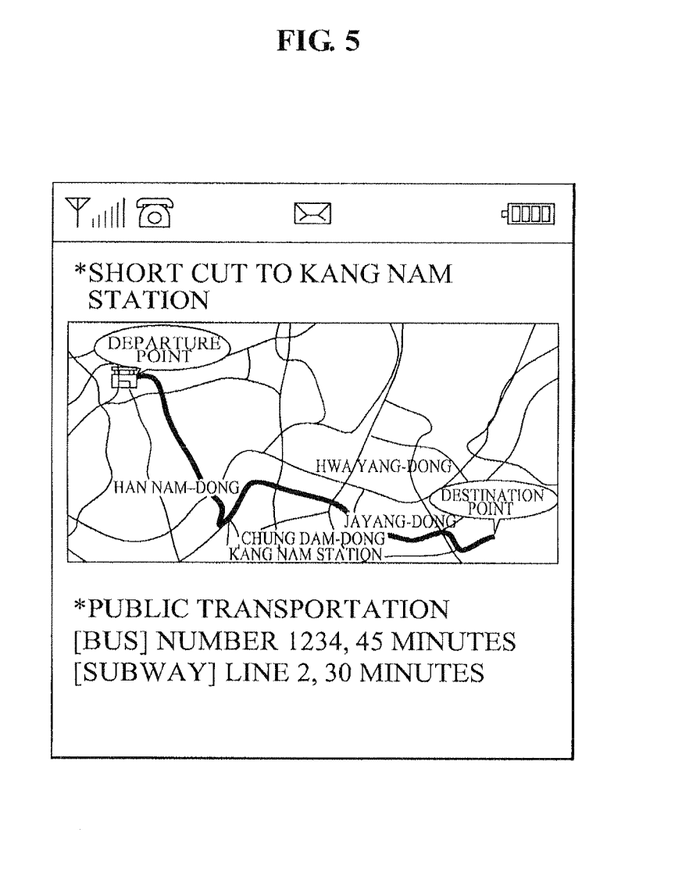
FIG. 5 is a diagram illustrating an example of providing traffic information from a user's present location to an appointment location.

FIG. 5 is a diagram illustrating an example of providing traffic information from a user's present location to an appointment location.

Referring to FIG. 5, the traffic information providing unit 140 of FIG. 1 provides a fastest route from the user's present location of a departure point to the Kang Nam Station of a destination point, or provides public transportation information used by the user, such as line numbers of a bus or a subway and a required time to reach the destination point.

As described above, according to the present invention, the user may arrive more quickly at the appointment location by being provided traffic information related the appointment location registered in the appointment schedule.

The sending unit 130 of FIG. 1 sends a reporting message to the user's mobile communication terminal or the target person's mobile communication terminal when the user arrives at or is close to the location registered in the schedule based on the user's location information.

Figure 6:
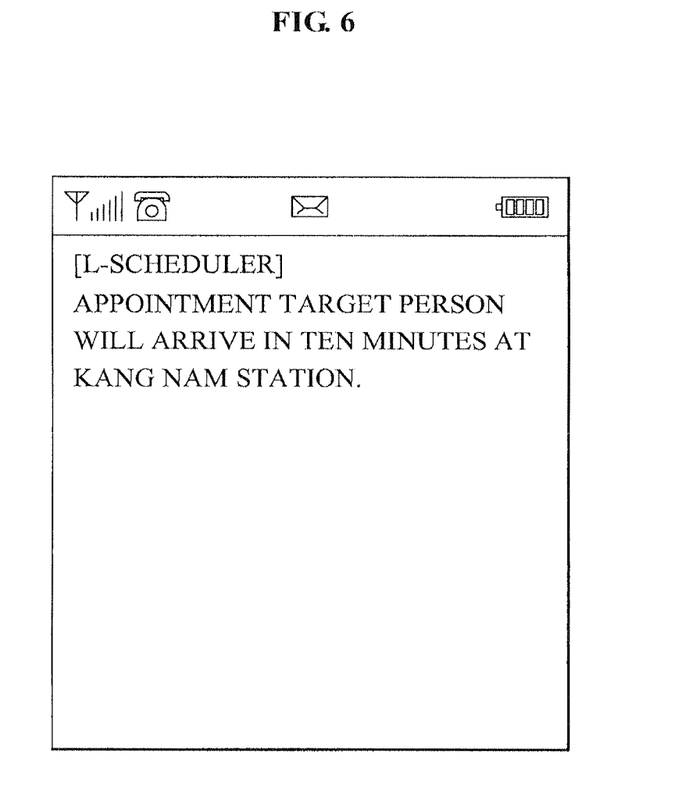
FIG. 6 is a diagram illustrating an example of a message reporting user's estimated time of arrival to an appointment target person.

FIG. 6 is a diagram illustrating an example of a message reporting user's estimated time of arrival to the appointment target person.

Referring to FIG. 6, the sending unit 130 of FIG. 1 sends a text message reporting the user's estimated time of arrival to the appointment target person using the appointment target person's telephone number being registered in the appointment schedule. Also, the sending unit 130 reports the user of the user's estimated time of arrival at the appointment place based on the user's location information. Further to this, the sending unit 130 sends the information of a changed appointment time and place to the appointment target person when the user changes the appointment schedule.

As described above, the present invention has an advantage in that the user or the target person may be informed in advance of the user's estimated time of arrival at the appointment place or the user or the target person may be informed in advance of the changed appointment information according to the registered appointment schedule, based on the user's location information.

Figure 7:
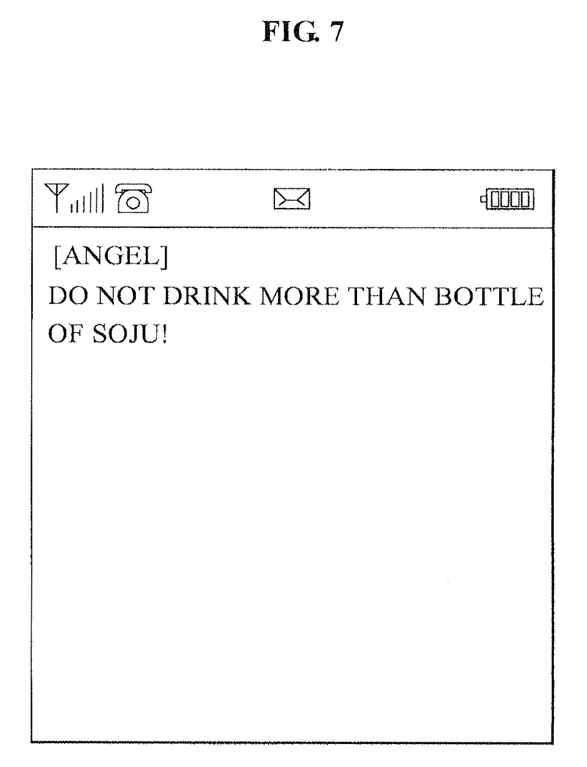
FIG. 7 is a diagram illustrating an example of a self-management message which is sent to the user.

FIG. 7 is a diagram illustrating an example of a self-management message which is sent to the user.

Referring to FIG. 7, the sending unit 130 of FIG. 1 sends a text message such as "Do not drink more than a bottle of Soju!", which is a previously registered self-management message in the user's terminal, when the user is close to a location corresponding to the user's location registered in the schedule in order to send the self-management message based on the user's location information.

As described above, the present invention reconfirms the user's appointment by sending the pre-registered self-management message to the user when the user is close to the location corresponding to the pre-registered user's location, therefore may assist the user to manage himself/herself.

The sending unit 130 sends the message of informing the user's location information to the pre-registered target person when the detected user's location information is close to the location corresponding to the user's location registered in the schedule.

Figure 8:
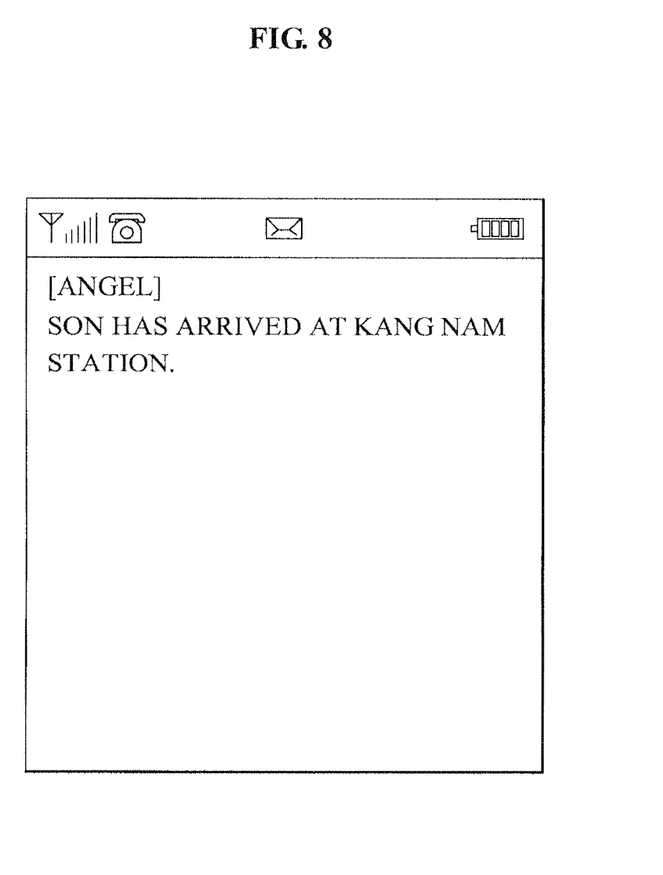
FIG. 8 is a diagram illustrating an example of a message which reports user's location information to a pre-registered person.

FIG. 8 is a diagram illustrating an example of a message which reports a user's location information to a pre-registered person.

Referring to FIG. 8, the sending unit 130 of FIG. 1 sends a text message to a target person's mobile communication terminal when the detected user's location is around Kang Nam Station, since a pre-registered zone is Kang Nam Station.

As an example, when the user is a student, a zone information registered in the user's schedule is a school or an institution and registered information of a target person is a parents' number, the sending unit 130 may detect the user's location and once the user goes to school or an institution, and may send the detected user's location information to a terminal corresponding to the parents' number. Also, the parents who have checked the user's location information may send a text message such as 'Study hard!' to the user.

As described above, the present invention may detect the user's location and deliver the user's location information to the user's family or friends, after registering location information of a place where the user should not go to or of a place where the user should go to.

The character management unit 150 of FIG. 1 increases and/or decreases an index number related a user's character depending on whether the user arrives at the appointment location in time based on the user's location. The character may be appointed as various types of objects preferred to by the user such as a house, a plant, a pet, a person, and the like.

As an example, when a user uses an animal-raising game such as 'Tamagochi' being preferred by the user, the character management unit 150 may grow a game character when the user arrives at the appointment location in time. Also, the character management unit 150 may decrease the game character's life points when the user does not arrive at the appointment location in time.

Figure 9:
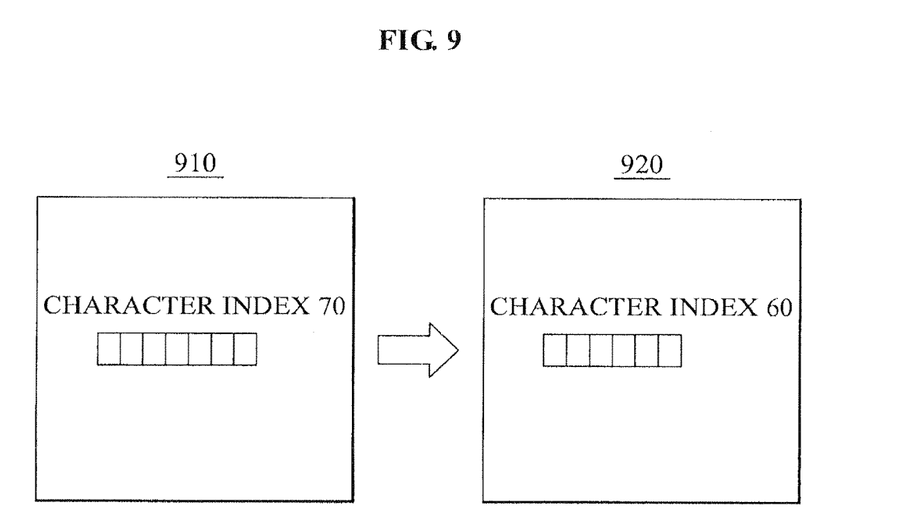
FIG. 9 is a diagram illustrating an example of a decrease of a character index depending on breaking an appointment time.

FIG. 9 is a diagram illustrating an example of a decrease of a character index depending on breaking an appointment time, Referring to FIG. 9, a reference numeral 910 indicates a user's character index is 70 when the user registers an appointment time and an appointment location in the Schedule. A reference numeral 920 indicates a user's character index is decreased to 60 due to an appointment time delay since the user has not arrived at the appointment location in time.

That is, the character management unit 150 may decrease the user's character index as illustrated in FIG. 9 since the user did not arrive at the appointment location in time, which means the user could not keep the appointment based on the user's location information.

As described above, the present invention may give a motivation to the user to make the appointment schedule more consistently by decreasing the user's character index as a penalty for not making the appointment schedule.

Figure 10:
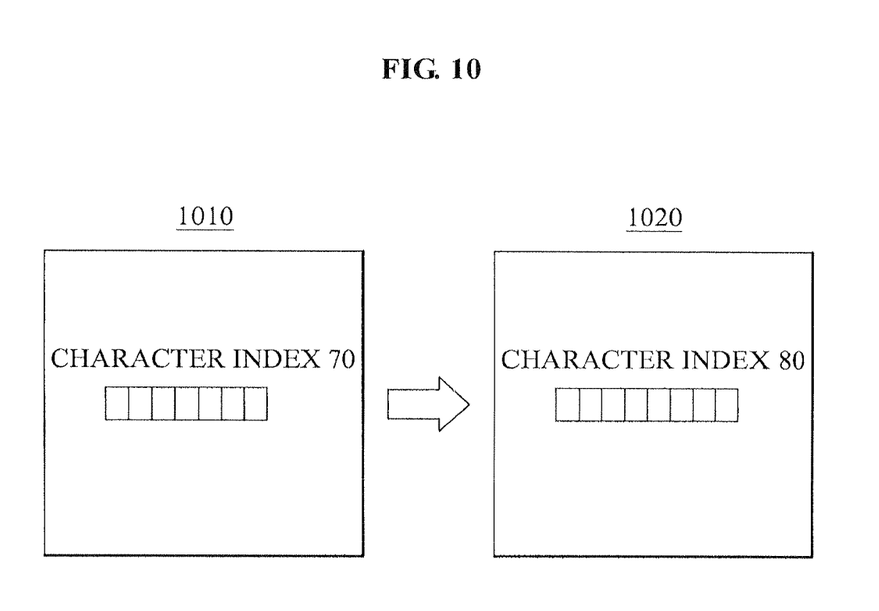
FIG. 10 is a diagram illustrating an example of a decrease of a character index when an appointment time is made.

FIG. 10 is a diagram illustrating an example of a decrease of a character index when an appointment time is made.

Referring to FIG. 10, a reference numeral 1010 indicates a user's character index is 70 when a user registers an appointment time and an appointment location in the schedule. A reference numeral 1020 indicates a user's character index is increased to 80 since user has made the appointment by arriving at the appointment location within the time registered in the schedule.

That is, the character management unit 150 of FIG. 1 may increase the user's character index as illustrated in FIG. 10, since the user has made the appointment by arriving at the appointment location in time based on the user's location information.

As described above, the present invention may give a motivation to the user to make the appointment schedule more consistently by increasing the user's character index as a reward for making the appointment schedule.

Figure 11:
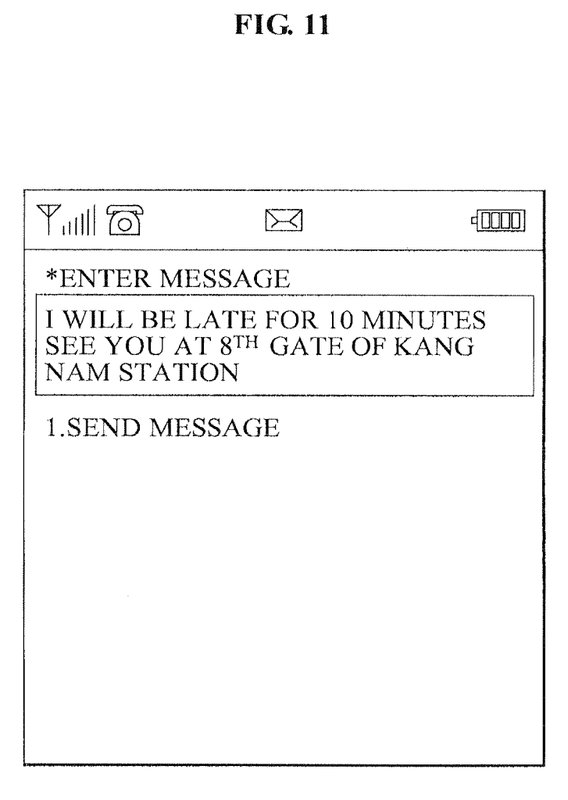
FIG. 11 is a diagram illustrating an example of entering a message due to an appointment time delay.

FIG. 11 is a diagram illustrating an example of entering a message due to an appointment time delay.

Referring to FIG. 11, a user enters a reporting message of delaying an appointment time to an appointment target person using a mobile communication terminal when the user does not arrive at an appointment location in time. The sending unit 130 of FIG. 1 may send a registered message of delaying of the appointment time to the appointment target person in advance using the mobile communication terminal.

As described above, the present invention may inform the appointment target person in advance of when the user will not arrive at the appointment location in time.

Figure 12:
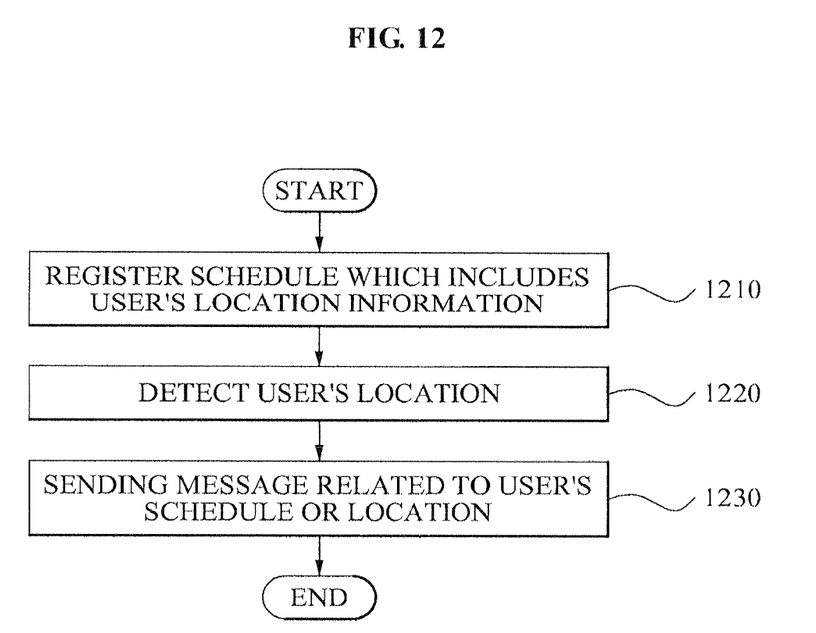
FIG. 12 is a flowchart illustrating a method for managing a schedule using a user's location information according to another embodiment of the present invention.

FIG. 12 is a flowchart illustrating a method for managing a schedule using a user's location information according to another embodiment of the present invention.

Referring to FIG. 12, in operation 1210, a system for managing a schedule registers a schedule which includes user's location information.

As an example, as illustrated in FIG. 2, in operation 1210, the system for managing the schedule receives an appointment location, appointment contents, an appointment time, and an appointment target person's telephone number from a user, and registers the received appointment location, appointment contents, appointment time and appointment target person's telephone number as an appointment schedule.

As another example, as illustrated in FIG. 3, in operation 1210, the system for managing the schedule receives location information and a self-management message from a user, and registers the received location information and self-management message as a schedule. The self-management message is to report factors enabling the user to make it to a zone when the user is close to the zone corresponding to the registered location information.

In operation 1220, the system for managing the schedule may detect the user's location. Specifically, when the user has a mobile communication terminal, in operation 1220, the system for managing the schedule may detect the user's location by detecting a location of the user's mobile communication terminal via a base station.

In operation 1230, the system for managing the schedule may send messages related to the schedule or the user's location. That is, in operation 1230, the system for managing the schedule may send the messages related to the schedule or the user's location to the user's mobile communication terminal or to a pre-registered target person's terminal.

Specifically, as illustrated in FIG. 4, in operation 1230, the system for managing the schedule may send a message to report the appointment schedule to the user's terminal or the pre-registered target person's terminal.

As another example, as illustrated in FIG. 5, in operation 1230, the system for managing the schedule may provide the user's terminal with traffic information from the user's location to the appointment location, The traffic information includes information of a shortest course when the user uses a vehicle and information of line numbers of a bus or a subway, and includes required information to get to the destination point when the user uses public transportation.

As still another example, as illustrated in FIG. 6, in operation 1230, the system for managing the schedule may send information of an estimated time of arrival at the appointment location to the appointment target person's terminal.

As yet another example, as illustrated in FIG. 7, in operation 1230, the system for managing the schedule may send a self-management message when the detected user's location information is close to a location corresponding to the user's location registered in the schedule.

As a further example, as illustrated in FIG. 8, in operation 1230, the system for managing the schedule may send a message reporting the user's location information when the detected user's location information is close to a location corresponding to the user's location registered in the schedule.

As another example, as illustrated in FIG. 9 or FIG. 10, in operation 1230, the system for managing the schedule may send a message reporting an increase and/or a decrease of an index related to the user's character depending on whether the user arrives at the appointment location in time, based on the user's location.

As described above, the method for managing the schedule according to the present invention may give motivation to the user to make the appointment schedule better by decreasing the user's character index as a penalty for not making the appointment schedule. Also, the method for managing the schedule according to the present invention may give motivation to the user to make the appointment schedule more often by increasing the user's character index number as a reward for making the appointment schedule.

The method for managing the schedule based on user's location information according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, there is provided a method and system for managing a schedule using a user's location information which registers a schedule including the user's location information, detects user's location, and provides information about the user's location or schedule.

Also, according to the present invention, there is provided a method and system for managing schedule using a user's location information which reports the user's location information in advance to the user or a pre-registered person when another user is close to a location pre-registered by the user.

Also, according to the present invention, there is provided a method for managing schedule using a user's location information and system thereof providing ideal route information to make the user arrive at the appointment location within registered appointment time in the schedule.

Also, according to the present invention, there is provided a method and system for managing the schedule using a user's location information which provides the user with optimal route information so that the user may arrive at an appointment location within a registered appointment time in the schedule.

Also, according to the present invention, there is provided a method and system for managing the schedule using a user's location information which sends a pre-registered self management message to the user when the user is close to a pre-registered location in the schedule.

Also, according to the present invention, there is provided a method and system for managing the schedule using a user's location information which sends the user's location information of moving to appointment information such as an appointment location registered in the schedule.

The foregoing descriptions of specific embodiments of the present invention have been presented for purposes of illustration and description. They are not intended to be exhaustive or to limit the invention to the precise foul's disclosed, and obviously many modifications and variations are possible in light of the above teaching. Therefore, it is intended that the scope of the invention be defined by the claims appended thereto and their equivalents.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for managing a schedule of a user by a system for managing a schedule based on location information of the user, the method comprising:
  receiving schedule information, including appointment time and appointment location to meet a target person along with contact information of the target person, into a schedule registration unit of the system;
  providing an index related to a character of the user depending on whether the user arrived at other appointment locations on time from a character management unit;
  registering the schedule information in the schedule registration unit of the system;
  receiving a location of the user from a location detecting device of the system;
  sending a first message through a sending device of the system to the target person confirming the appointment location; and
  sending a second message through the sending device to the user with regard to the index of the character management unit,
  wherein the first message includes traffic information from the location of the user to the appointment location, and
  wherein the second message indicates if the index is increased or decreased based on whether the user arrives at the appointment location in time.

2. The method of claim 1, wherein the traffic information includes map data displaying the location of the user and an expected arrival time of the user.

3. A system for managing a schedule based on location information of a user, the system comprising:
  a schedule registration unit having
  schedule information including appointment location and contact information of a target person;
  a location detecting device for detecting a location of the user;

a character management unit having an index related to a character of the user depending on whether the user arrived at other appointment locations on time; and a sending device for sending messages to the target person, wherein the schedule registration unit receives the location of the user from the location detecting device, sends a first message through the sending device to the target person confirming the appointment location; and sends a second message through the sending device to the user with regard to the index of the character management unit, wherein the first message includes traffic information from the location of the user to the appointment location, and wherein the second message indicates if the index is increased or decreased based on whether the user arrives at the appointment location in time.

4. The system of claim 3, wherein the traffic information includes map data displaying the location of the user and an expected arrival time of the user.

5. A method for managing a change in a schedule of a user by a system, the method comprising:

receiving a schedule information including at least one of an appointment location, appointment contents, an appointment time, and a phone number for a target person into a schedule registration unit of the system;

registering the schedule information which includes location information of the target person by the schedule registration unit of the system;

providing an index related to a character of the user depending on whether the user arrived at other appointment locations on time from a character management unit;

receiving a current location of the user from a location detecting device of the system into the schedule registration unit;

determining by the schedule registration unit whether the current location of the user is included in an area corresponding to the location information of the target person;

sending a first message through a sending unit related to the schedule or the current location of the user to the target person, when the current location of the user is determined by the schedule registration unit to be in an area corresponding to the location information of the target person; and sending a second message through the sending device to the user with regard to the index of the character management unit, wherein the first message includes traffic information from the current location of the user to the appointment location, and wherein the second message indicates if the index is increased or decreased based on whether the user arrives at the appointment location in time.

6. The method of claim 5, wherein the traffic information includes map data displaying the current location of the user and an expected arrival time of the user.

7. A system for managing a changed schedule of a user in meeting an other person, the system comprising:

a schedule registration having schedule information including at least one of an appointment location, appointment contents, an appointment time, a phone number for the other person and location information of the other person;

a location detecting device for detecting a current location of the user;

a character management unit having an index related to a character of the user depending on whether the user arrived at other appointment locations on time; and a sending device for sending messages to the other person, wherein the schedule registration unit receives the current location of the user from the location detecting device, determines whether the current location of the user is included in an area corresponding to the location information of the other person, sends a first message related to the schedule or the current location of the user to the other person, when the current location of the user is included in an area corresponding to the location information of the other person; and sends a second message through the sending device to the user with regard to the index of the character management unit, wherein the first message includes traffic information from the current location of the user to the appointment location, and wherein the second message indicates if the index is increased or decreased depending on whether the user arrives at the appointment location in time.

8. The system of claim 7, wherein the traffic information includes map data displaying the current location of the user and an expected arrival time of the user.

* * * * *